United States Patent [19]

Scholich

[11] 4,445,006

[45] Apr. 24, 1984

[54] FOUR-WIRE CONVERSION CIRCUIT FOR A TELEPHONE SUBSCRIBER LINE

[75] Inventor: Peter Scholich, Schloss Neuhaus, Fed. Rep. of Germany

[73] Assignee: Nixdorf Computer AG, Fed. Rep. of Germany

[21] Appl. No.: 251,552

[22] Filed: Apr. 6, 1981

[30] Foreign Application Priority Data

Apr. 14, 1980 [DE] Fed. Rep. of Germany ....... 3014187

[51] Int. Cl.³ .............................................. H04B 1/58
[52] U.S. Cl. ......................... 179/170 NC; 179/170 T
[58] Field of Search .............. 179/18 FA, 81 R, 81 A, 179/170 T, 170 NC

[56] References Cited

U.S. PATENT DOCUMENTS

| | | | |
|---|---|---|---|
| 3,823,272 | 7/1974 | Tabalba | 179/170 T |
| 3,886,322 | 5/1975 | Colardelle et al. | 179/170 NC |
| 3,970,805 | 7/1976 | Thomas | 179/170 NC |
| 4,041,252 | 8/1977 | Cowden | 179/170 NC |
| 4,087,647 | 5/1978 | Embree et al. | 179/18 FA |
| 4,163,878 | 8/1979 | Hashemi | 179/170 NC |
| 4,300,023 | 11/1981 | Kelley et al. | 179/170 NC |
| 4,388,500 | 6/1983 | Regan | 179/170 T |

OTHER PUBLICATIONS

U. Appel & P. Abramson; "Electronic Hybrid for Telephone Using a Differential Amplifier," IBM Technical Disclosure Bulletin; Oct. 1973; pp. 1513-1514.

Primary Examiner—A. D. Pellinen
Assistant Examiner—Randall P. Myers
Attorney, Agent, or Firm—Krass and Young

[57] ABSTRACT

In the circuit arrangement according to the invention, the two transistors with their main current lines connected in series cause no disturbance of balance in the subscriber's line. By means of exclusively alternating current coupling on the subscriber's lines wire leads, extension elements which cause no galvanic voltage drop can also be connected on. The series connection of the main current lines of the transistors may be run directly to the input of the amplifier emitting the outgoing signals.

5 Claims, 2 Drawing Figures

FOUR-WIRE CONVERSION CIRCUIT FOR A TELEPHONE SUBSCRIBER LINE

DESCRIPTION

TECHNICAL FIELD

The invention relates to a circuit arrangement for the two-wire connection of a telephone subscriber to one line each for outgoing and incoming signals with two power sources which are connected to one subscriber's wire lead.

BACKGROUND ART

Such a circuit arrangement is known (German Auslegeschrift No. 2,649,024). Here a subcriber's line wire lead with its assigned power source is connected by way of the series circuit of a transmitting diode, serving for loop current detection, of an optical coupler and of a resistor, so that this series circuit and the impedance of the subscriber's line form two branches, connected in series, of a bridge circuit; two further branches are formed by the connection in series of a resistor and a capacitor or a resistor, which are connected between the other subscriber's line wire lead and the junction point of the series circuit consisting of a transmitter diode and resistor with the assigned power source, and in the neutral arm of this bridge circuit is interposed the transmitting diode of another optical coupler, the receiving diode of which, by way of a further interposed amplifier, acts on the first input of the amplifier which emits the outgoing signals. For this the transmitting diode serving for current detection and the resistor which is in series with it in a bridge arm create an asymmetry in the subscriber's line which must be eliminated with a relatively great circuit complexity. Besides this, the above-mentioned bridge circuit and the further connection means connected at its output in the transmission channel for the outgoing signals require a great complexity.

DISCLOSURE OF THE INVENTION

The invention is based on the problem of constructing a circuit arrangement of the type mentioned at the start in such a way that the balancing is done with little circuit complexity and that any intended line asymmetry occurring is indicatd by way of a digital output signal, and that even during a line asymmetry the gaining of outgoing signals from the signals on the subscriber's line is not impaired, so that in the amplifier emitting the outgoing signals an exact compensation with respect to the incoming signals is made at any time. In this way a high asymmetry attenuation, a high common-mode rejection and a good transmission attenuation are achieved.

In the circuit arrangement according to the invention, the two transistors with their main current lines connected in series cause no disturbance of balance in the subscriber's line. By means of exclusively alternating current coupling on the subscriber's lines wire leads, extension elements which cause no galvanic voltage drop can also be connected on. The series connection of the main current lines of the transistors may be run directly to the input of the amplifier emitting the outgoing signals. This results in an extremely simple circuit.

Designs of the circuit arrangement are given in the subclaims.

BRIEF DESCRIPTION OF THE DRAWINGS

The invention will be explained in detail in the following on the basis of drawings in which embodiment examples are represented. In these.

DETAILED DESCRIPTION OF THE SPECIFIC EMBODIMENT

Figure 1:
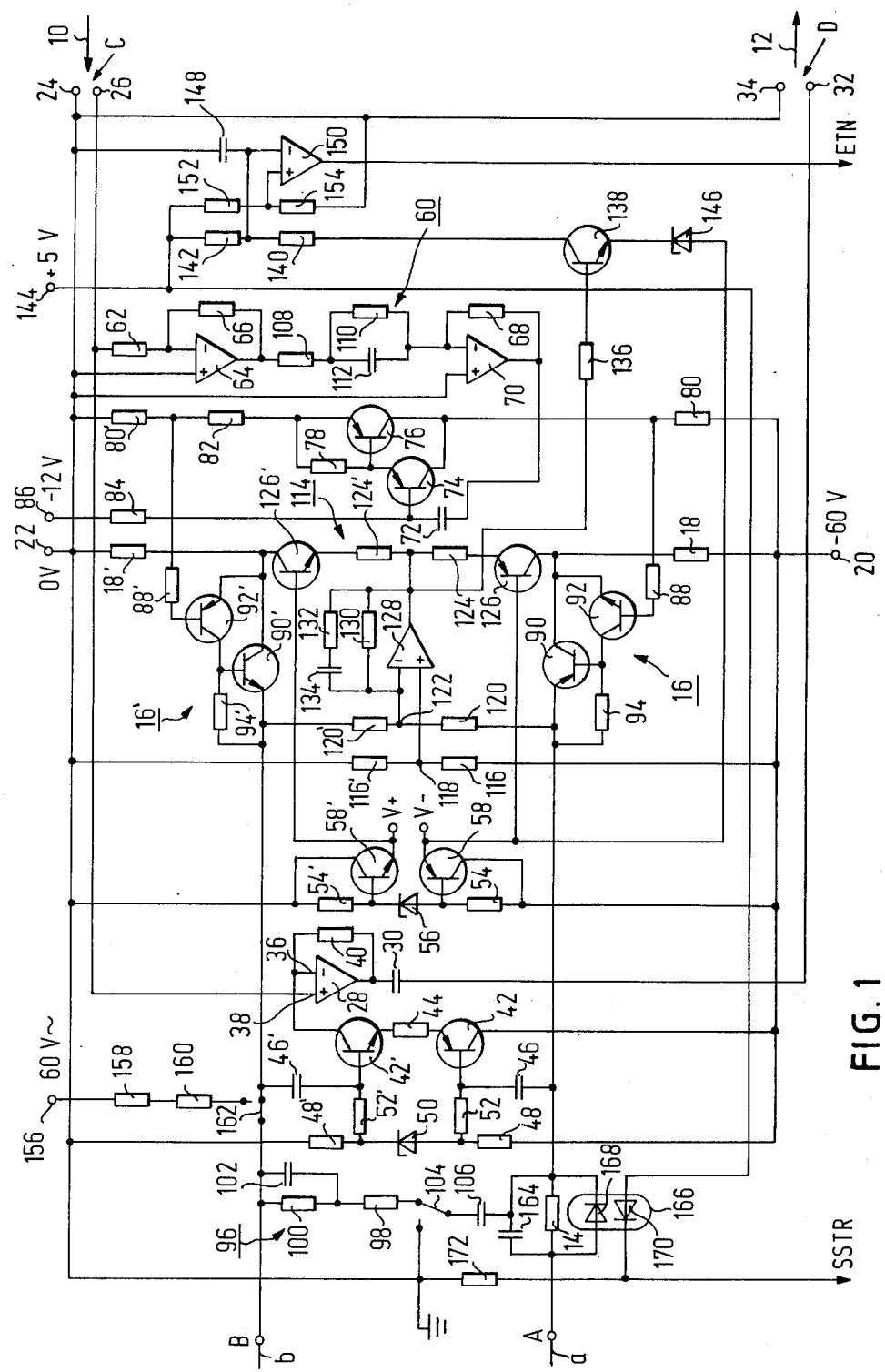
FIG. 1 shows a first embodiment example of a circuit arrangement for the two-wire connection of a telephone subscriber.

The circuit arrangement represented in FIG. 1 serves for connecting a subscriber's set, not represented, by way of the lead wires a,b of a subscriber's line to the terminals A,B, as well as for the power supply of the subscriber's line. Moreover, the circuit arrangement has the function of a two-wire-four-wire terminating set with the terminals A,B for the subscriber's line, an input C for incoming low-frequency signals (direction of the arrow 10) and an output D for outgoing low-frequency signals (direction of the arrow 12). Low-frequency signals coming from the subscriber's set by way of the subscriber's line and the terminals A,B are to be transmitted solely to output D and not to input C. Signals coming in on input C must be transmitted solely by way of the terminals A,B to the subscriber's set, not to the output D. Moreover, the circuit arrangement has the task of providing the subscriber's set if necessary with a ringing alternating voltage for the bell of the subscriber's set, of detecting the current flowing in the subscriber's line and, in case of a ground fault in one of the subscriber's line lead wires a,b, of generating a corresponding ground fault signal ETN.

For the power supply of the subscriber's line, its lead wire a is connected by way of the terminal A and a precision resistor to a power source 16, which in turn is connected by way of a resistor 18 of low resistance value to the negative pole 20 of a line voltage source, not represented. The other pole 22 of the line voltage source is grounded and therefore supplies 0 volts. The line voltage amounts to $-60$ volts. The subscriber's line lead wire b is connected by way of the terminal B to a power source 16', which in turn is connected to the pole 22, which is connected to the ground, of the line voltage source by way of a resistor 18', the resistance value of which is the same as that of the resistor 18.

The circuit arrangement is constructed largely symmetrical with respect to the half line voltage ($-30$ volts); circuit elements and circuit parts constructed and arranged symmetrically to one another, for example the power sources 16,16', have reference numbers which in one case consist of a number and in the other case of the same number but with a prime mark provided.

The power sources 16,16', in the absence of signals between the terminal 24 connected to the ground and the terminal 26 of input C, conduct equal direct currents opposite in direction to one another. These can be modulated at the input C so that incoming signals are transmitted to the subscriber's line. The signals occurring on the subscriber's line are on the other hand transmitted, by way of an operational amplifier 28 and a capacitor 30 connected to the output of the latter, to the terminal 32 of the output D, the other terminal 34 of which is connected to the ground. In order that the signals coming from the input C and transmitted to the subscriber's line shall not go by way of the amplifier 28 to the output D and be able to be emitted there, the amplifier 28 has applied to it at its first, inverting, input 36 a signal proportional to the alternating part of the current flowing over the subscriber's line lead wires a,b, and at its second, noninverting, input 38 are applied the incoming signals, in which way a compensation is made such that the outgoing signals do not contain the incoming signals. For applying the incoming signals to it, the input 38 is connected directly to the terminal 26 of the input C. For achieving a proportional amplification, a resistor 40 is connected between the output of the operational amplifier 28 and the latter's first, inverting, input 36. The capacitor 30 giving rise to an exclusively alternating-current coupling prevents any drift in the output signal of the amplifier 28 from being transmitted to the output D.

For transmitting the signals coming in on the subscriber's line, that is the alternating part of the current flowing over the subscriber's line wire leads a,b, the first input 36 of the amplifier 28 is supplied with current by way of the connection in series of the main current lines of two transistors 42,42' which are controlled respectively by the potential of one subscriber's line wire lead a,b. The transistor 42 is a pnp transistor, the transistor 42' a npn transistor. Between their emitters is connected a resistor 44. The end of the series circuit formed by the main current line of the transistor 42', the resistor 44 and the main current line of the transistor 42 which end is turned toward the amplifier 28 is connected to the pole 20 of the voltage supply. In prinicple the bases of the transistors 42,42' may be connected directly to the wire leads a,b. However, it is advantageous for the bases, as in the embodiment example, to be connected to direct currents which are symmetrical with respect to the half supply voltage, for setting the operating point, whereas for feeding the alternating current portions of the subscriber's line current, the bases are advantageously connected by way of respective capacitors 46,46' to the wire leads a,b. For this the capacitor 46, properly speaking, is connected to the junction of the precision resistor 14 and the power source 16.

For producing the bias d-c voltages of the transistors 42,42', the line voltage source is connected to a voltage divider formed by the connection in series of a resistor 48, a Zener diode 50 and another resistor 48', and the gates of the transistors 42,42' are connected by way of one series resistance 52,52' each with one terminal each of the Zener diode 50. In the embodiment example the Zener diode 50 has a Zener voltage of 3.9 volts, the resistors 48,48' have resistance values of 33 kohm and the resistance values of the series resistances 52,52' are 40.2 kohm each.

For supplying the current for the operational amplifier 28 as well as for other operational amplifiers, yet to be described, in the circuit arrangement, these are connected to a supply voltage V+,V— which is less than the line voltage and is balanced with respect to the half-line voltage. To produce this supply voltage, the line voltage source is connected to a voltage divider formed by the connection in series of a resistor 54, a Zener diode 56 and another resistor 54', and two bipolar transistors 58,58' with opposite types of conduction, which with their emitters each form one pole V— or V+ of the supply voltage, are connected by their collectors to one pole 20 and 22 each of the link voltage source and by their bases are connected to one terminal each of the Zener diode 56. The connection between the supply voltage source thus formed and all operational amplifiers is not shown in the drawings for better visibility.

The incoming signals which are transmitted to the subscriber's line undergo a frequency-dependent level distortion there by reason of the not purely resistive behavior of the subscriber's line. Hence no complete compensation of the incoming signals for their representation fed by way of the transistors 42,42' is possible without special measures taken at the inputs 36,38 of the amplifier 28. In order to achieve a complete compensation and moreover to conduct the incoming signals to the subscriber as free from distortion as possible, the incoming signals are transmitted to the power sources 16,16' by way of a passive impedance 60 which brings about a level equalization. Before its action is described, the modulation of the power sources 16,16' by the incoming signals will be explained.

The incoming signals, by way of the terminal 26 and a resistor 62, are applied to the inverting input of an operational amplifier 64, which is fed back by way of a resistor 66 having the same resistance value as the resistor 62, and the noninverting input of which amplifier is grounded. Between the output of the operational amplifier 64, which thus acts as a phase-inverter amplifier, and the inverting input of another operational amplifier 70, wired as a phase-inverter amplifier with a resistance 68, is connected the impedance 60. The output of the operational amplifier 70 is applied by way of a capacitor 72 to the input of a Darlington stage formed by transistors 74,76 and a resistor 78. This stage is connected by the main current line of its output transistor 76 to a variable voltage divider connected with the line voltage, which divider includes a resistor 80 connected to the pole 20, the Darlington stage, a resistor 82, and a resistor 80' connected to the pole 22. The bias voltage of −12 volts which is less than the line voltage and which serves to set the operating point, is applied at a terminal 86 to the input transistor 74 by way of a resistor 84. With an input signal fed by way of the capacitor 72 and a correspondingly varying conductivity of the transistor 76, the resulting voltages on the resistors 80,80' vary in a reverse direction. With these the power sources 16,16' constructed as complementary Darlington stages are controlled by way of resistors 88,88'. These sources each show a high power transistor 90 or 90' connected between the terminal A or B and the resistor 18 or 18', an input transistor 92,92' complementary to the high-power transistor 90,90', the emitter of which input transistor is connected to the junction of the high-power transistor 90,90' with the assigned resistor 18,18' and the collector of which transistor is connected with the base of the high-power transistor 90,90', and also show a resistor 94,94' connected between the base and the emitter of the high-power transistor 90,90'.

The currents flowing through the power sources 16,16' are respectively large enough that the voltage dropping on the resistance 18 or 18' plus the diffusion potential of the input transistor 92 or 92' equals the control voltage dropping at the resistor 80 or 80'. For achieving a current balance it is therefore expedient to have equal diffusion potentials of the input transistors 92,92', as well as resistance values 18,18' which are as near equal as possible. However, the contrast to the usual Darlington circuits, the diffusion potential of the high-power transistor 90 has no effect on the current balance with the complementary Darlington stages chosen. This is all the more important in that it is just in the high-power transistors 90,90' that, by reason of their greater power dissipations than those of the input transistors 92,92', relatively large variations in their diffusion potentials can be caused by the corresponding temperature variations.

The subscriber's set, as already noted, does not have a purely resistive impedance for low-frequency signals. For matching, it is advantageous to connect an equally large impedance between the subscriber's line terminals A,B, as is also the case in the embodiment example, for which reason this will be considered first before an explanation of the level equalization. The matching impedance 96 consists of a resistor 98 of 220 ohms and in series with this a parallel connection of another resistor 100 of 1.2 kohm with a capacitor 102 of 120 nF. This matching impedance 96 is switchable by means of a changeover switch 104 and a relatively large capacitor 106 of 47 nF between the terminal 8 and the junction of the precision resistor 14 with the power source 16.

The impedance 60 serving for level equalization, however, shows a design corresponding to the matching impedance 96 and to the impedance of the subscriber's set, and a corresponding impedance value, though one transformed with regard to the amplification occurring. It consists of a resistor 108 and the parallel connection of another resistor 110 and a capacitor 112 connected in series with this. The resistance value of the resistor 108 is 100 times greater than that of the resistor 98, that is it is 22 kohm. The resistance value of the resistor 110 is likewise 100 times greater than that of the resistor 100, that is 120 kohm. The capacitance of the capacitor 112 is smaller by the same factor, but now used as a divisor, than that of the capacitor 102, i.e., it is 1.2 nF. In this way a practically complete level equalization and thus as complete a compensation as possible for a mean power output on the amplifier 28 are achieved, so that in the whole transmissible low-frequency range the incoming signals can reach the output D only highly attenuated.

Insofar as the circuit arrangement has been described above in regard to the transmission of signals from the subscriber's line to the output D and in regard to avoiding any transmission of signals from the input C on the output D, there are obviously modifications possible also. Thus for instance field-effect transistors may be provided in place of the bipolar transistors 42,42'. Insofar as their main current lines shows a privileged conduction direction, they should also have complementary conductivity types. Moreover, an additional amplification of the outgoing signals is possible, even though the circuit described shows the advantage of especially great simplicity with only a single operational amplifier 28 and the transistors 42,42'.

Even though the transistors 42,42', because of their coupling by way of the capacitors 46,46' against any possible asymmetries occurring on the subscriber's line, are largely insensitive, brief fluctuations in balance may nonetheless lead to an effect on the transistors 42,42'. Moreover, it is advantageous in any case to provide means for exact balancing. Such means are described in the following.

Between the junction of the power source 16 with the resistor 18 on the one hand and the junction of the power source 16' with the resistor 18' on the other hand, a resistive circuit 114 is connected in, over which a direct current flows which is smaller in amount than the direct current flowing over the subscriber's line. The former current leads to a voltage drop on the resistors 18,18'. During a disturbance of balance the distribution of the current flowing over the resistive circuit 114 changes, thus counteracting the disturbance of the balance.

In addition to the above-described passive balancing action of the resistive circuit 114, the latter forms part of a control circuit with a balancing action which will be described in the following.

Connected to the line voltage source is a voltage divider formed of resistors 116,116' having equal resistance values, on the tap 18 of which divider a reference voltage is available which equals half of the line voltage. Between the terminals, turned toward the subscriber's wire leads a,b, of the power sources 16,16', that is between the emitters of their high-power transistors 90,90', there is another symmetrical voltage divider which is formed of resistors 120,120' having equal resistance values. Thus a current can be taken off its tap 122 which, when the balance of the wire leads a,b of the subscriber's line is undisturbed, also equals half the line voltage. The voltages obtained at the taps 118,122 are compared with one another, and if the result of the comparison is a deviation, the current flowing over the resistive circuit 114 is changed as a function of this. The resistive circuit 114 consists of two branches symmetrical to one another, one of which consists of a series circuit of a resistor 124 and a transistor 126 and the other of a series circuit of a resistor 124' and the main current line of a transistor 126' complementary to the transistor 126. When a control intervention changes the current flowing over the resistive circuit 114 as a result of an existing deviation, the current in one branch 124,126 then is varied oppositely to that in the other branch 124',126'. In the embodiment example this is done by means of an operational amplifier 128 which is connected by its noninverting input to the tap 118 and by its inverting input to the tap 122, so that it acts at the same time as the reference element forming the deviation. A resistor 130 is connected between the output of the operational amplifier 128 and its inverting input. Parallel to this resistor, moreover, is connected the series connection of another resistor 132 with a capacitor 134. The resistor 130 is effective during changes in balance, which for example result from fluctuations in the line voltage. Its resistance is chosen to be large compared with the resistance values of the resistors 116,116',120,120' and large compared with the resistance values of the branches 124,126; 124',126'; in the embodiment example this is 1 M ohm. The return branch formed from the resistor 132 and the capacitor 134 serves for the dynamic attenuation of asymmetries in the transmission of incoming signals to the subscriber's line. For this the choice of the values of the resistor 132 and of the capacitor 134 must be a compromise between a high asymmetry attenuation which is at least 56 db and preferably more than 60 db, and a good transmitting attenuation of greater than 30 db. Advantageous values for the resistance value of the resistor 132 and the capacitance of the capacitor 134 have been found to be 56 kohm and 100 nF.

The branches of the resistive circuit 114 may in principle consist exclusively of d-c resistances. The transistors 126,126' inserted in the branches are set at a respective operating point by means of control voltages obtained from the line voltage and symmetrical to the half line voltage, that is by means of the potentials V+, V− of the supply voltage of the operational amplifier. This gives the advantage that when there are fluctuations in the line voltage the conductivities of the transistors 126,126' are changed in opposite directions, in which way any disturbances of the subscriber's line by voltage fluctuations in the supply voltage are counteracted.

The above-described balance control circuit has the property that, both with a grounding of the subscriber's line wire lead a and with a grounding of the subscriber's line wire lead b, the inverting input of the operational amplifier 128 becomes more strongly positive than its noninverting input and that thus the operational amplifier 128 generates an output signal which becomes more strongly negative. This property can be utilized for a very simple detection of ground faults without separate circuits each assigned to a subscriber's line wire lead a,b, as would be necessary at the state of the art. To generate a ground fault signal, the output of the operational amplifier 128 and thus the midpoint of the resistive circuit 114 is connected by way of a resistor 136 to the base of a transistor 138. Its collector is connected by way of resistors 140,142 to a binding post with a low positive voltage (30 5 volts), while the emitter of the transistor 138 is connected by way of a Zener diode 146 with a prescribed negative potential stronger than half of the line voltage, namely with the negative potential V— of the supply voltage for the operational amplifier in the embodiment example. The transistor 138 is conductive in its state of rest. But if, in the case of a ground fault, the output voltage of the operational amplifier 128, because of its overshooting which then occurs, drops approximately to the potential V—, then the transistor 138 becomes blocked. The dropping voltage on the resistor 142, when the transistor 138 is conductive, is applied to the inverting input, grounded by way of a capacitor 148 in alternating current, of an operational amplifier 150. Between the binding post 144 and the ground is connected a voltage divider formed of resistors 152,154, to the tap of which divider the noninverting input of the operational amplifier 150 is connected, in order to feed to the latter a voltage which when the transistor 138 is conductive is the same as the voltage connected to the inverting input. But if due to a ground fault the transistor 138 becomes nonconductive and if as a result the positive voltage of the binding post 144 is applied to the noninverting input, then the operational amplifier generates an output signal ETN indicating the ground fault.

To supply the telephone bell of the subscriber's set with a ringing a-c voltage, there is an a-c voltage of 60 v available at a binding post 156. This can be fed to the subscriber's line wire lead b by way of a resistor 158 with a positive temperature coefficient, which serves for short-circuit protection, and a resistor 160 connected in series with this, and by way of a changeover switch 162 formed from the contacts of a switching relay; when the changeover switch 162 is actuated, the power source 16' is separated from the wire lead b. The side of the ringing a-c voltage turned away from the binding post 156 is connected to the ground. In order for the ringing a-c voltage to be able to flow from the subscriber's line wire lead a to the ground, the changeover switch 104 is provided which is located between the capacitor 106 and the matching impedance 96 and in the actuated state connects the ground instead of the matching impedance with one coating of the capacitor 106. The latter thus has the double task of connecting the matching impedance 96 in alternating current between the terminals A,B and of feeding the ringing alternating current when there is a call.

The circuit arrangement also has the task of detecting the direct current flowing into the subscriber's line. For this the voltage dropping on a power source 16 or 16' is usually detected. This voltage however is distorted by the capacitances present in the circuit arrangement, especially by the capacitor 106. In this way, when voltage variations are detected by way of the voltage on a current generator, for example with the use of a subscriber's set with a dial telephone, the dialing impulses show attenuated and also differing front and rear sides which can no longer ensure a reliable evaluation. These difficulties are avoided in the present circuit arrangement by connecting in a precision resistance in one wire lead of the subscriber's line—lead a in the embodiment example—and detecting the dropping voltage on it, for evaluating the current flowing in this subscriber's line. The precision resistance 14 is by-passed by a relatively large capacitor 164, which represents a partial short circuit for the ringing alternating current, the capacitance of which, however, together with the low resistance value of the precision resistance 14, forms only a slight time constant, so that for example dialing impulses may be detected practically undistorted. The capacitor 106 is connected by its coating turned toward the changeover switch 104 to the junction of the precision resistance 14 and the power source 16. For evaluating the voltage dropping on the precision resistance 14 and for achieving a separation of potential, it is expedient to use an optical coupler 166, the transmitting diode 168 of which is connected in parallel to the precision resistance 14. The receiving diode 170 of the optical coupler 166, in the embodiment example, is connected in series with an operating resistor 172 between the binding post 144 and the ground and thus at a relatively low voltage, and at the junction between the receiver diode 170 and the resistor 172 a voltage SSTR proportional to the subscriber's line current is taken off.

Figure 2:
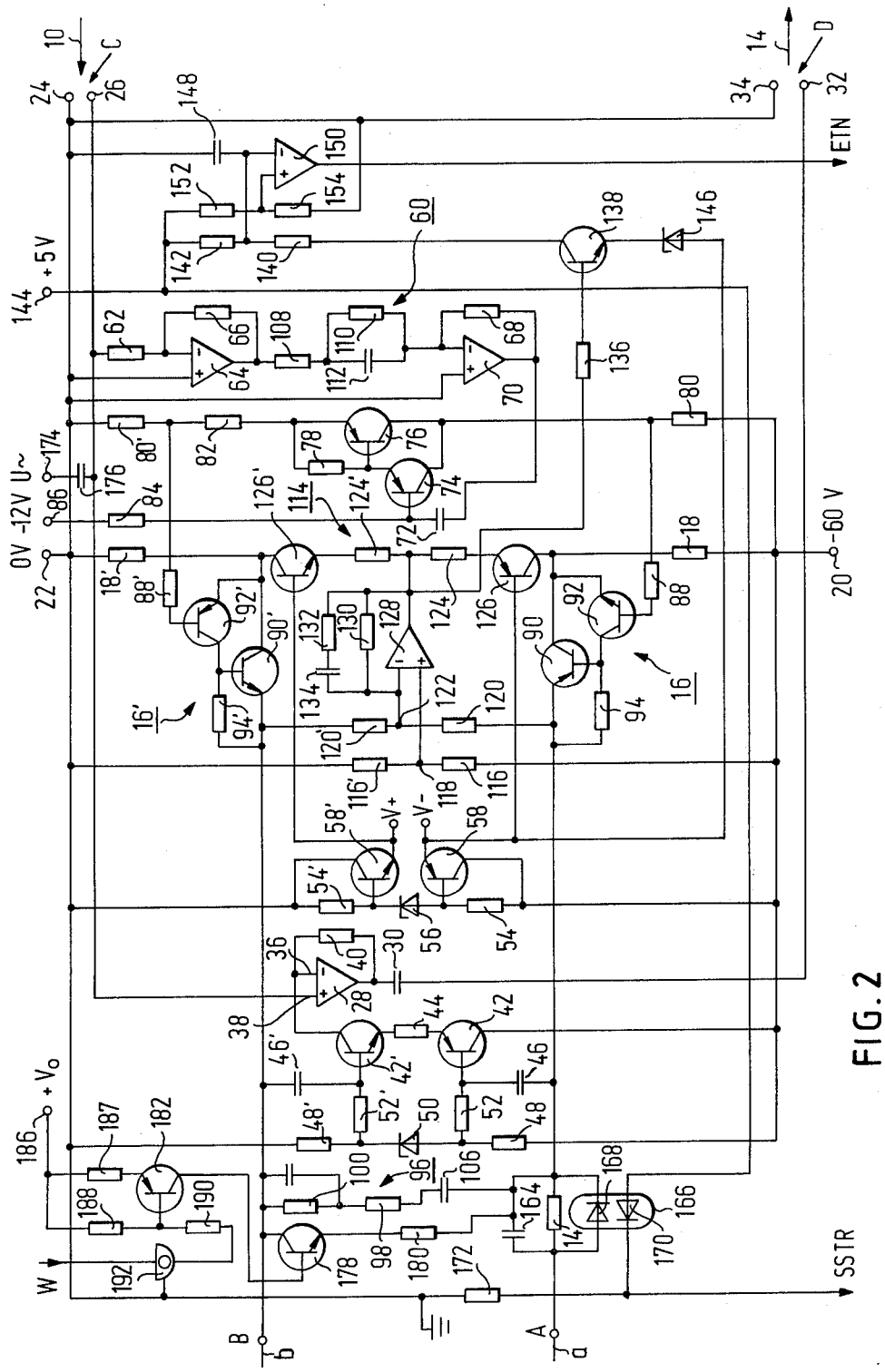
FIG. 2 shows another embodiment example of such a circuit.

The embodiment example represented in FIG. 2 agrees largely with that according to FIG. 1; the same parts are designated with the same reference symbols. One difference from the embodiment example according to FIG. 1, however, is in how a ringing a-c voltage is transmitted to the subscriber's bell. This is done essentially by having an a-c voltage instead of a low-frequency voice signal fed to the input C as a control voltage, by means of which the currents flowing over the power sources 16,16' are modulated accordingly. Hence a relatively low a-c voltage is sufficient for the control voltage. This a-c voltage U, in the embodiment example, is fed to the terminal 26 of the input C by way of a binding post 174 and a capacitor 176. This can eliminate the parts 105 and 156 to 162 in FIG. 1. On the other hand, a direct-current connection between the terminals A,B is necessary for supplying the ringing a-c voltage, since the power sources 16,16' must in turn generate a direct current as a mean value on which the ringing alternating current is superimposed. To produce this direct-current connection, a connection in series of a transistor 178 and a resistor 180 is used, which is connected between the terminal B and the junction of the precision measuring resistance 14 with the power source 16. The transistor 178 is triggered by the main current line, connected before its base, of another transistor 182 which is connected in series with a ballast resistance 184 to a terminal 186, which is connected to a suitable voltage $+V_0$. The latter also supplies the series connection of a resistor 188, another resistor 190 and an electronic switch 192, which is triggered for the feeding of the a-c voltage U by a d-c voltage signal W. The component voltage then dropping on the resistor 188 makes the transistor 182, connected by its base to the junction of the resistors 188,190, conductive, which in turn controls the transistor 178 conductively.

The especial advantage of the ringing voltage transmission according to FIG. 2 lies in the balancing which is maintained here in regard to the ringing a-c voltage also, in which way any transmission of the ringing a-c voltage from the subscriber's line to adjacent lines is practically excluded, whereas in the conventional unbalanced transmission of the ringing a-c voltage, as is also done in FIG. 1, an effect on adjacent lines can be avoided only with great extra design efforts.

In summary, the two embodiments described are distinguished by a high suppression of supply voltage fluctuations, by an independence of frequency of the input resistance and of the terminating set transmission attention, by a loop current independent of the length of the line, by short-circuit protection even against the negative line voltage terminal, by a high suppression of direct-axis component of the voltage and by a high frequency stability of the transmitting level as well as by the advantages explained.

I claim:

1. A two-wire to four-wire telephonic circuit arrangement comprising:
   a pair of modulating input signal terminals (24,26);
   a pair of output signal terminals (32,34);
   a pair of subscriber terminals (a,b);
   first and second normally balanced power sources (16,16') having respective voltage level power supplies (20,22) and respective modulation signal inputs connected to one of the input signal terminals (24) and having respective outputs connected in the subscriber terminals (a,b);
   an amplifier (28) having an output connected to one of the output signal terminals (32) and a first input connected to an input signal terminal (26) to receive the modulation signals;
   control means connecting the subscriber terminals (a,b) to the second input of the amplifier (28) and comprising a pair of transistors (42,42') of opposite phase conductivity having respective control electrodes connected through respective low frequency filter capacitors (46,46') to respective subscriber terminals (a,b), the output of one of the transistors (42') being connected to said other input of amplifier (28);
   bias means (48,48',50) connected to the control electrodes of said transistors (42,42') for setting the operating point of said transistor (42,42'); and,
   the other of said input signal terminals (24) being commonly connected to the other of said output signal terminals (34).

2. Circuit arrangement as claimed in claim 1, wherein said transistors (42,42') are of opposite conductivity type and each comprises an emitter-collector circuit, said control means further comprising a d-c resistor (44) connected in series between the emitter-collector circuits of the respective transistors (42,42').

3. The circuit arrangement defined in claim 2 wherein said bias means comprises a voltage divider consisting of the series combination of a resistor (48), a Zenor diode (50), and a second resister (48'), connected between a line voltage source (22) and a point of reference potential, opposite sides of the Zener diode being connected through respective bias resistors (52,52') to the control electrodes of respective transistors (42,42').

4. Circuit arrangement as claimed in claim 1 further including a capacitor (30) acting as a low frequency and d-c filter connected between the output of the amplifier (28) and the output terminal (32).

5. A circuit arrangement as defined in claim 1 further including means (162) for connecting one of the subscriber terminals (B) to an a-c ringing voltage source.

* * * * *